(12) United States Patent  
Asai

(10) Patent No.: US 7,252,496 B2  
(45) Date of Patent: Aug. 7, 2007

(54) INJECTION MOLDING MACHINE

(75) Inventor: Ikuo Asai, Ohbu (JP)

(73) Assignee: Kabushiki Kaisha Meiki Seisakusho, Aichi-Ken (JP)

( * ) Notice: Subject to any disclaimer, the term of this patent is extended or adjusted under 35 U.S.C. 154(b) by 25 days.

(21) Appl. No.: 11/171,284

(22) Filed: Jul. 1, 2005

(65) Prior Publication Data

US 2006/0040014 A1 Feb. 23, 2006

(30) Foreign Application Priority Data

Aug. 23, 2004 (JP) ............................. 2004-242340

(51) Int. Cl.
*B29C 45/34* (2006.01)

(52) U.S. Cl. ...................... 425/210; 249/141; 425/227; 425/542; 425/812

(58) Field of Classification Search ................ 425/190, 425/210, 227, 542, 810, 812; 249/141; 264/1.33

See application file for complete search history.

(56) References Cited

U.S. PATENT DOCUMENTS

| 4,880,581 | A | * | 11/1989 | Dastoli et al. | ............... | 264/39 |
| 5,759,218 | A | * | 6/1998 | Martin et al. | ............... | 55/385.1 |
| 5,834,035 | A | * | 11/1998 | Osada et al. | ............... | 425/116 |

FOREIGN PATENT DOCUMENTS

JP   2000-202862   7/2000

* cited by examiner

*Primary Examiner*—Yogendra N. Gupta
*Assistant Examiner*—Emmanuel S. Luk
(74) *Attorney, Agent, or Firm*—Browdy and Neimark, PLLC

(57) ABSTRACT

In an injection molding machine 1 for supplying clean air 10 to a die 8 in a direction perpendicular to a direction that opens/closes the die 8, in order to effectively pass the clean air 10 through an opened space in the die 8 so as to prevent dust from depositing on a die cavity surface or a molded product when the die 8 is opened and a ventilating hole 12 is provided in a safety door 11 provided so as to be in parallel with the die opening/closing direction.

3 Claims, 2 Drawing Sheets

INJECTION MOLDING MACHINE

BACKGROUND OF THE INVENTION

1. Field of the Invention

The present invention relates to a technology for preventing dust or the like from being contained in a product such as an optical product.

2. Description of Related Art

Japanese Unexamined Patent Publication (Kokai) No. 2000-202862 discloses a prior art in the above technical field. Japanese Unexamined Patent Publication (Kokai) No. 2000-202862 discloses an apparatus for producing a disk substrate made of resin, in which a molten resin material is injected into a cavity formed between a pair of dies, and the resin material is cooled and solidified to produce a disk substrate, wherein there are provided a disk substrate forming portion provided with upper and lower openings, in which the dies are disposed, and an air supplying portion for supplying clean air to the disk substrate forming portion; the clean air is supplied from the air supplying portion to the disk substrate forming portion via the upper opening of the disk substrate forming portion and, then, passes through the portion of the disk substrate forming portion, in which the dies are disposed, and is discharged to the outside of the disk substrate forming portion via the lower opening of the disk substrate forming portion.

However, when a disk substrate is formed, as a molded product is removed from the dies by a removing machine which can access the upper or side portion of the dies, it is unnecessary to provide an opening in the lower portion of the disk substrate forming portion. Accordingly, the lower portion of the disk substrate forming portion may be closed, or a die-temperature controller or the like may be disposed on the lower portion of the disk substrate forming portion. In such a case, a flow of the clean air toward the lower portion of the disk substrate forming portion is obstructed and, accordingly, dust deposits on the die and is included in a molded product.

BRIEF SUMMARY OF THE INVENTION

The present invention provides an injection molding machine for supplying clean air to a die in a direction perpendicular to a direction that opens/closes the die, wherein a ventilating hole is provided in a safety door provided so as to be in parallel with the die opening/closing direction. Accordingly, the clean air effectively passes through an opened space in the die so as to prevent dust from depositing on a die cavity surface or a molded product when the die is opened.

BRIEF DESCRIPTION OF THE DRAWINGS

Embodiments of the present invention will be described in detail with reference to the drawings.

DETAILED DESCRIPTION OF THE INVENTION

Figure 1:
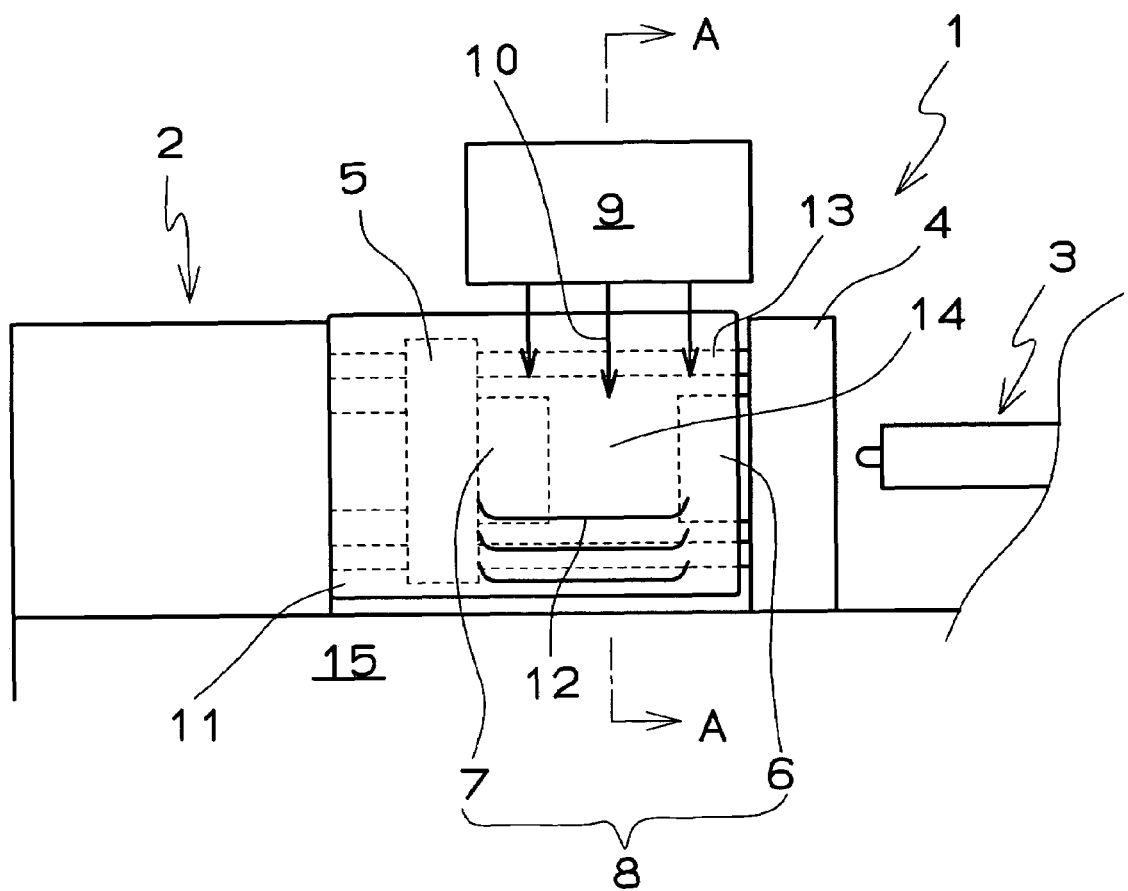
FIG. 1 is a front view of an embodiment of an injection molding machine according to the present invention.

An injection molding machine 1 for forming a disk substrate is composed of a clamping device 2 for opening/closing and clamping a die 8, and an injection device 3 for injecting and charging a molten material to the die 8. The clamping device 2 is composed of a stationary plate 4 to which a stationary portion 6 of the die 8 is attached, a movable plate 5 to which a movable portion 7 of the die 8 is attached, and a driving device (not shown). The driving device is composed of a toggle, a hydraulic cylinder, etc., and causes the movable plate 5 to slide on a tie rod 13, to move close to or away from the stationary plate 4 so that the die 8 is closed, or opened, and clamped. The die 8 is a die for forming a disk substrate, and a transferring stamper is provided on at least one of the stationary portion 6 and the movable portion 7. The clamping device 2 and the injection device 3 are disposed on an upper surface of a base 15. When the movable plate 5 is moved away from the stationary plate 4 to open the die 8 and form a die-opened portion 14, the upper face of the base 15 beneath the die 8 is closed, or even if the upper face is provided with an opening, a temperature controller for the die 8 or the like obstructs the opening. Therefore, there is no air passage beneath the die-opened portion 14. FIG. 1 shows an example of a horizontal injection molding machine 1 in which the die 8 is horizontally opened or closed. However, the present invention may be applied to a vertical injection molding machine in which the die is vertically opened or closed. The application of the injection molding machine is not limited to formation of a disk substrate.

A safety door 11 prevents an operator from accessing the die-opened portion 14 while opening/closing and clamping the die 8. The safety door 11 can be moved in the directions that open/close the die 8, is closed while the die 8 is closed and clamped, and is opened while the die 8 is opened. However, it is unnecessary to open the safety door 11 because molded products are automatically and successively removed from the die 8 by a removing device or the like when the products are continuously molded. Accordingly, the safety door 11 is mainly opened when a molding operation is manually carried out and the die 8 is maintained and inspected. Therefore, the safety door 11 may be replaced with a safety fence which cannot be opened or closed but can be easily detached or attached. Such the safety door 11 and the safety fence are provided so as to be in parallel with the die-opening/closing directions, on front and rear side faces of a space provided between the stationary plate 4 and the movable plate 5. The devices having the above functions are generically called "safety door".

Figure 2:
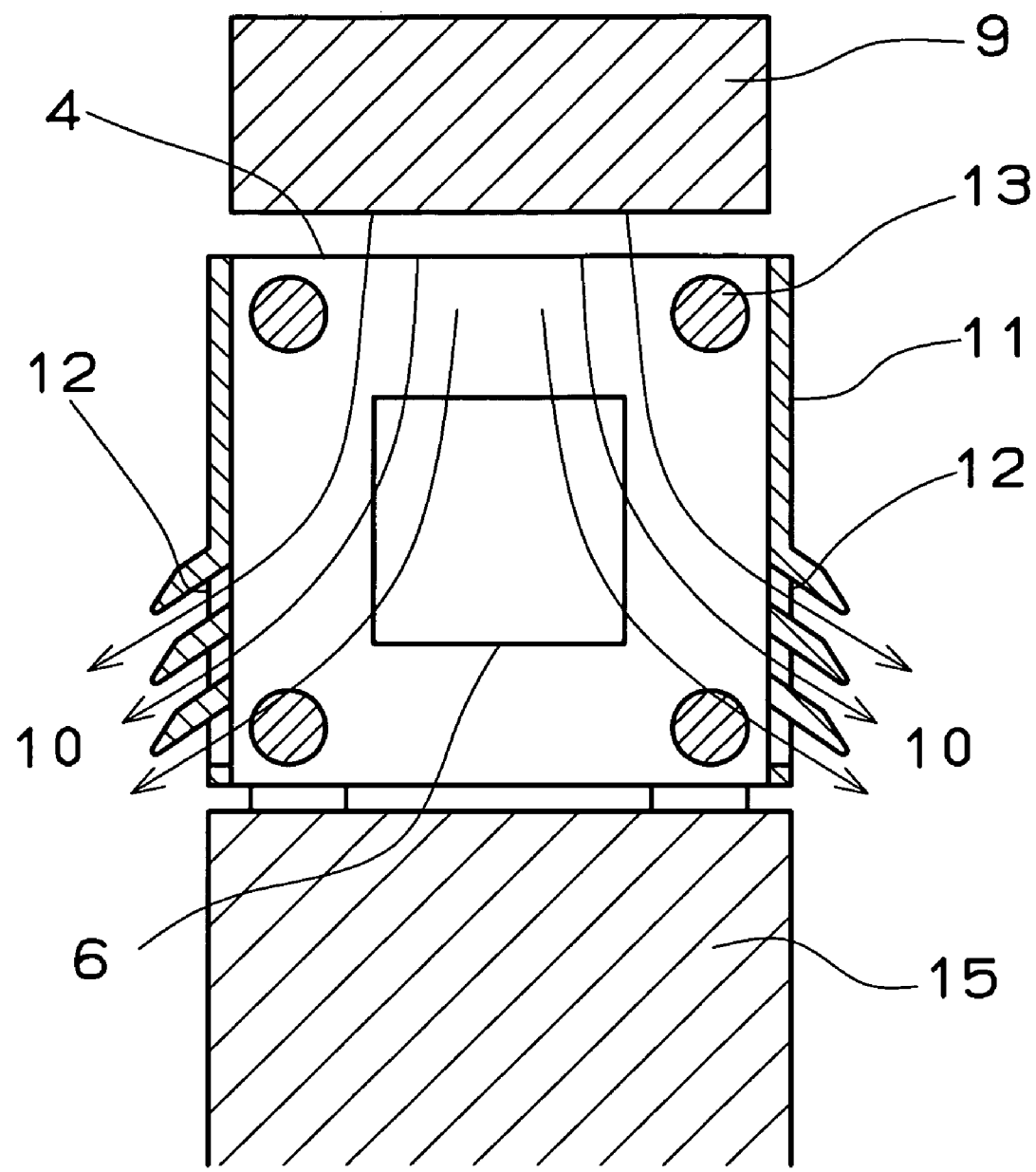
FIG. 2 is a sectional view of an opened die, taken along the line A-A in FIG. 1.

A clean air source 9 is provided in a direction perpendicular to the opening-and-closing directions of the die 8, i.e., above the die 8. The safety door 11 has a ventilating hole 12 disposed on the lower portion of the safety door 11, i.e., most away from the clean air source 9. It is preferable that the ventilating hole 12 is shaped like a louver having a plurality of slots provided in the opening-and-closing directions of the die 8 and each covered with a closure extending obliquely downward. However, the ventilating hole 12 may be composed of a number of through-holes which are small enough to prevent a finger or the like from being inserted thereinto. It is preferable that the ventilating hole 12 is provided in the lower portion of the safety door 11 and concentrated in the vicinity of the lower end of the safety door 11. In general, the outer periphery and the outer edge of the safety door 11 are made of a metal plate, and the central portion thereof is made of a transparent plate. The ventilating hole 12 may be provided in any portion of the safety door 11. As shown in FIG. 2, it is preferable that the ventilating hole 12 is provided in both safety doors 11 provided on opposite sides. However, depending on the direction of a clean air 10, the ventilating hole 12 may be provided in the safety door 11 provided on only one side.

The clean air source 9 having therein a device necessary to generate and supply clean air is preferably used. However, the device necessary to generate and supply clean air, which is jointly used for another injection molding machine, may be provided at a position away from the injection molding machine 1, and only a duct of the clean air source 9 is provided so as to open toward the upper portion of the die-opened portion 14 of the injection molding machine 1.

As shown in FIG. 2, the clean air 10 downwardly supplied from the clean air source 9 flows into the die-opened portion 14, flows along opened surfaces of the die 8, and is discharged through the ventilating hole 12. Accordingly, at the instant when the die 8 is opened, dust contained in air surrounding the die 8 is prevented from depositing on a cavity surface of the die 8 or a molded product, by removing the air. Thus, the dust can be prevented from being contained in a molded product.

The present invention is not limited to the above-described embodiment, and several modifications may be made therein without departing from the gist of the invention.

What is claimed is:

1. An injection molding machine for supplying clean air to a die in a direction perpendicular to a direction that opens/closes the die,
   wherein a safety door is provided extending parallel to the opening and closing direction of the die,
   a ventilating hole is provided in the safety door so as to be generally parallel with the die opening/closing direction, and
   wherein the ventilating hole is provided in the portion of the safety door, which is most away from a clean air source of the clean air.

2. An injection molding machine for supplying clean air to a die in a direction perpendicular to a direction that opens/closes the die,
   wherein a safety door is provided extending parallel to the opening and closing direction of the die,
   a ventilating hole is provided in the safety door so as to be generally parallel with the die opening/closing direction, and
   wherein the ventilating hole is shaped like a louver.

3. An injection molding machine for supplying clean air to a die in a direction perpendicular to a direction that opens/closes the die,
   wherein a safety door is provided extending parallel to the opening and closing direction of the die,
   a ventilating hole is provided in the safety door so as to be generally parallel with the die opening/closing direction, and
   wherein the injection molding machine is provided for forming a disk substrate, and a transferring stamper is disposed on at least one of a pair of dies.

* * * * *